(12) United States Patent
Lee et al.

(10) Patent No.: US 9,688,558 B2
(45) Date of Patent: Jun. 27, 2017

(54) APPARATUS FOR CONCENTRATION REACTION OF CARBON DIOXIDE USING MAGNESIUM IONS IN SEAWATER, AND METHOD FOR SEQUESTRATING CARBON DIOXIDE IN OCEAN USING SAME

(75) Inventors: Jung Hyun Lee, Daejeon (KR); Jin Hyeok Choi, Daejeon (KR); Joon Woo Gil, Daejeon (KR)

(73) Assignee: KOREA ELECTRIC POWER CORPORATION, Seoul (KR)

( * ) Notice: Subject to any disclaimer, the term of this patent is extended or adjusted under 35 U.S.C. 154(b) by 204 days.

(21) Appl. No.: 14/412,636

(22) PCT Filed: Aug. 14, 2012

(86) PCT No.: PCT/KR2012/006487
§ 371 (c)(1),
(2), (4) Date: Jan. 2, 2015

(87) PCT Pub. No.: WO2014/010776
PCT Pub. Date: Jan. 16, 2014

(65) Prior Publication Data
US 2015/0191385 A1    Jul. 9, 2015

(30) Foreign Application Priority Data
Jul. 13, 2012  (KR) .................. 10-2012-0076864

(51) Int. Cl.
*C02F 9/00* (2006.01)
*B01D 53/62* (2006.01)
(Continued)

(52) U.S. Cl.
CPC .............. *C02F 9/00* (2013.01); *B01D 53/62* (2013.01); *C02F 1/20* (2013.01); *C02F 1/70* (2013.01);
(Continued)

(58) Field of Classification Search
CPC ..... C02F 9/00; C02F 1/20; C02F 1/70; B01D 53/62
See application file for complete search history.

(56) References Cited

U.S. PATENT DOCUMENTS 4,370,307 A * 1/1983 Judd .................. C01F 5/02
423/165

FOREIGN PATENT DOCUMENTS

| JP | 2010-132504 | 6/2010 |
| WO | WO 2009-000051 | 12/2008 |

OTHER PUBLICATIONS

International Search Report mailed Mar. 22, 2013 for PCT/KR2012/006487.

* cited by examiner

*Primary Examiner* — Chester Barry

(57) ABSTRACT

A method for sequestrating carbon dioxide in the ocean of the present invention coverts carbon dioxide into a high concentration of bicarbonate ions by using a neutralization method using calcium oxide commonly contained in alkaline industrial waste, prepares elution water for stably containing bicarbonate ions even when making contact with the atmosphere through aeration, and discharges the elution water into an area of the ocean of a relatively shallow depth to sequestrate carbon dioxide. According to the present invention, the present invention is a carbon dioxide storage method which uses alkaline industrial waste to carry out carbon dioxide ocean sequestration at relatively low cost, and can sequestrate carbon dioxide for a long time while minimizing bad environmental influences such as ocean acidification and the like, and is thus environmentally friendly. Therefore, it is possible to actively respond to (Continued)

carbon dioxide emission restrictions and simultaneously achieve economical efficiency by securing certified emission reductions henceforth.

6 Claims, 1 Drawing Sheet

(51) Int. Cl.
    *C02F 1/20*     (2006.01)
    *C02F 1/70*     (2006.01)
    *C02F 1/52*     (2006.01)
    *C02F 101/10*     (2006.01)
    *C02F 103/02*     (2006.01)
    *C02F 103/08*     (2006.01)
    *C02F 103/12*     (2006.01)
    *C02F 103/16*     (2006.01)
(52) U.S. Cl.
    CPC ............... *B01D 2251/402* (2013.01); *B01D 2252/1035* (2013.01); *B01D 2257/504* (2013.01); *C02F 1/5236* (2013.01); *C02F 2101/10* (2013.01); *C02F 2103/02* (2013.01); *C02F 2103/08* (2013.01); *C02F 2103/12* (2013.01); *C02F 2103/16* (2013.01); *Y02C 10/04* (2013.01)

APPARATUS FOR CONCENTRATION REACTION OF CARBON DIOXIDE USING MAGNESIUM IONS IN SEAWATER, AND METHOD FOR SEQUESTRATING CARBON DIOXIDE IN OCEAN USING SAME

TECHNICAL FIELD

The present invention relates to a carbon dioxide concentration reactor using magnesium ion in seawater and a carbon dioxide isolation method using the same. More particularly, the present invention relates to a carbon dioxide concentration reactor using magnesium ion in seawater and carbon dioxide isolation method using the same, which can be easily applied to plants, like power plants, steel mills, cement plants, etc., producing alkaline waste, such as coal ash, iron slag, cement residue or the like, and large amounts of carbon dioxide emissions, for disposal of or sequestration of carbon dioxide in the ocean using the alkaline wastes by converting carbon dioxide in seawater into bicarbonate ion containing seawater having a concentration of several tens of times higher than natural seawater through a neutralization reaction between calcium oxide in the waste and carbon dioxide in seawater to be discharged to the ocean, thereby contributing to long-term reduction of carbon dioxide.

BACKGROUND ART

A variety of techniques, including energy saving processes, high-efficiency power generation processes, renewable energy technologies, artificial forestation or biological processes, have been developed to attempt to reduce emissions of carbon dioxide ($CO_2$), which is one of representative greenhouse gases. However, under the current situation in which there is a need for continuous industrial development while maintaining the industrial foundation, a carbon capture and storage (CCS) (Sequestration) technique is a process capable of reducing large amounts of carbon dioxide emissions within a short period. The CCS technique may be divided into a capture process and a storage process.

The capture process consists of a pre-combustion capture process, an oxy-combustion process, and a post-combustion capture process. In the pre-combustion capture process, a carbon-containing fuel is converted into carbon dioxide and a hydrogen fuel using an appropriate reaction (e.g., a modification reaction, water gas shift reaction, etc.), carbon dioxide is captured and removed for combustion, thereby fundamentally preventing carbon dioxide from being produced in a reaction product.

In the oxy-combustion process, an absolute amount of exhaust gases can be reduced using only the nitrogen-removed oxygen, rather than using air as an oxidizer of a fuel, and carbon dioxide can be easily isolated and removed from the exhaust gases including only carbon dioxide and water.

The post-combustion capture process is a technique for isolating carbon dioxide from the post-combusted exhaust gas is isolated and is advantageous in that it can be most easily applied to the existing carbon dioxide sources.

The technique for isolating carbon dioxide may include a sequestration method using an appropriate solvent (for example, an amine-based absorber), a sequestration method using a separator membrane and a sequestration method using carbon dioxide absorption and adsorption of solid particles.

The carbon dioxide, once captured in the aforementioned manners, should then be stored using appropriate methods. Currently, methods of storing carbon dioxide in the ground or deep sea are generally being studied. According to these methods, carbon dioxide being in a supercritical state is injected into the underground space, such as an oil reservoir, a gas reservoir or a saline layer and then undergoes thermodynamic, hydrodynamic and chemical behaviors for sequestration and storage. However, there is a risk of re-emission of the stored carbon dioxide into the atmosphere or seawater due to limitation in the underground storage space and leakage of supercritical-state carbon dioxide stored at a high pressure. If carbon dioxide leaks in seawater, the marine ecosystem may be adversely affected by ocean acidification.

Other methods for sequestration and storage of large amounts of carbon dioxide include ocean storage methods. The ocean storage methods include a method of directly injecting carbon dioxide into the seawater to a depth of 1,000 m or greater and dissolving the same in the ocean, and a method of injecting high-density liquid carbon dioxide obtained by liquefying the carbon dioxide using a compressing device into an underground isolated space to a depth of 3,000 m or greater. However, in a case where carbon dioxide is directly injected into the seawater and stored in the ocean, the marine ecosystem may be affected by ocean acidification and there may be a possibility of re-emission of the dissolved carbon dioxide ultimately being in balance with the air. Thus, the direct injection method may not be considered as permanent sequestration and storage method. In addition, the method of injecting high-density liquid carbon dioxide is disadvantageous in that equipment and power for ocean acidification and liquefying and equipment and power for transportation of liquid carbon dioxide are required.

DISCLOSURE OF THE INVENTION

Technical Problem

Among various attempts at reducing emission of carbon dioxide ($CO_2$), the most technically feasible method is to capture a large amount of carbon dioxide to then store the captured carbon dioxide in the oil reservoir or gas reservoir on the ground, in the depleted oil reservoir, gas reservoir or aquifer in the seabed or in the deep ocean through injection into the ocean or an undercurrent stream method. However, the geologic storage of carbon dioxide has several disadvantages, including storage space limitation, carbon dioxide leakage and so on, and ocean injection and undercurrent stream method have disadvantages, including a probable risk of re-emission into the atmosphere, the impact of a pH change on the marine ecosystem, high treatment costs, and the like.

The present invention has been made in an effort to solve the problems of the prior art, and the present invention provides a carbon dioxide concentration reactor using magnesium ion in seawater and carbon dioxide isolation method using the same, wherein carbon dioxide is converted into a bicarbonate ion state having a high concentration using a neutralization method using calcium oxide commonly contained in industrial alkaline waste and then discharged into an area of the ocean of a relatively shallow depth for safe sequestration of carbon dioxide in the deep ocean using a density difference.

In order to prepare seawater containing a high-concentration bicarbonate ion using calcium oxide, the reaction scheme is carried out in the following manner:

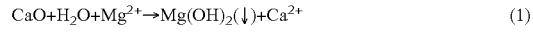

If the calcium oxide is injected into the seawater, it reacts with magnesium ion present in a concentration of approximately 50 mM in the seawater due to its higher solubility than the magnesium hydroxide, resulting in precipitation of the magnesium hydroxide. On reacting with the carbon dioxide, a considerable amount of the precipitated magnesium hydroxide may be dissolved. The bicarbonate ion ($HCO_3-$) as a product resulting from the reaction may serve as a buffered solution in an aqueous solution state to minimize a change in the pH level. In addition, since the seawater containing bicarbonate ion ($HCO_3-$) having a high concentration has a higher density than natural seawater, it can be stored in the deep ocean in an economically efficient manner using a density difference without separate energy consumption, thereby facilitating sequestration of carbon dioxide for a long time.

However, carbon dioxide may be re-emitted to the atmosphere at a discharged position making contact with the atmosphere, like at a surface layer of the ocean, due to equilibrium. Accordingly, in order to overcome the problem with the re-emission of carbon dioxide, a total amount of inorganic carbons in the seawater may be made to be in equilibrium before the carbon dioxide is discharged to the ocean through aeration.

Technical Solution

According to an aspect of the present invention, there is provided a carbon dioxide concentration reactor using magnesium ion in seawater, wherein alkaline waste containing calcium oxide (CaO) or calcium oxide is injected into the seawater to allow the calcium oxide to react with magnesium ion present in the seawater to form magnesium hydroxide ($Mg(OH)_2$) for precipitation, after the precipitation of magnesium hydroxide, a supernatant of the seawater is removed and a lower layer liquid of the seawater containing the magnesium hydroxide and carbon dioxide are allowed to react with each other to convert carbon dioxide into concentrated seawater containing bicarbonate ions ($HCO_3-$) having a higher concentration than in a natural state.

The concentration reactor may include an alkaline waste supply unit supplying alkaline waste containing calcium oxide or calcium oxide, a seawater inflow unit for feeding the seawater, a multi-stage reactor system supplied with the calcium oxide and seawater and allowing the calcium oxide and seawater to react with each other, a precipitation tank installed at an end of the multi-stage reactor system and precipitating magnesium hydroxide generated from the calcium oxide and the seawater, a seawater outflow unit installed at a top end of the precipitation tank and allowing the seawater remaining after reacting with the calcium oxide to be discharged, a gas inflow unit installed at a bottom end of the precipitation tank, supplying the precipitation tank with carbon dioxide and air and allowing the carbon dioxide and magnesium hydroxide to react with each other to form bicarbonate ion, and a concentrated seawater outflow unit installed in the precipitation tank and discharging concentrated seawater containing the bicarbonate ion.

Here, partition walls may be installed at front ends of the respective reactors of the multi-stage reactor system and at a front end of the precipitation tank, so that the flow of the seawater is introduced to a bottom to then be discharged upwardly.

An agitator may be installed in each reactor of the multi-stage reactor system to facilitate a reaction between the calcium oxide and the seawater and to allow particles of the magnesium hydroxide to move up to the precipitation tank without being interrupted.

The precipitation tank may include a diffuser diffusing and flowing the carbon dioxide into the precipitation tank, and an agitator facilitating a reaction between the carbon dioxide and precipitated magnesium hydroxide.

According to another aspect of the present invention, there is provided a carbon dioxide isolation method using magnesium ion in seawater, the carbon dioxide isolation method including injecting alkaline waste containing calcium oxide (CaO) or calcium oxide into the seawater to allow the calcium oxide to react with magnesium ion present in the seawater to form magnesium hydroxide ($Mg(OH)_2$) for precipitation, after the precipitation of magnesium hydroxide, removing a supernatant of the seawater and allowing a lower layer liquid of the seawater containing the magnesium hydroxide and carbon dioxide to react with each other to form concentrated seawater containing bicarbonate ions ($HCO_3-$) having a higher concentration than in a natural state, supplying the concentrated seawater with air to make bicarbonate ion in the seawater stably exist without being changed due to a contact with the air, and discharging the concentrated seawater having a pH level in the same range of between 8.0 and 8.2 with natural seawater to the ocean.

The discharging of the concentrated seawater to the ocean may include directly discharging the concentrated seawater containing the bicarbonate ion to the ocean through a pipe line.

Advantageous Effects

As described above, in the carbon dioxide concentration reactor using magnesium ion in seawater and carbon dioxide isolation method using the same according to an embodiment of the present invention, carbon dioxide as a major greenhouse gas can be sequestrated for a long time in an environmentally friendly manner. In particular, the present invention provides environmentally friendly storage of carbon dioxide in the ocean recognized as the maximum storage space while minimizing shortcomings of re-emission of carbon dioxide into the atmosphere, ocean acidification and the like. A large amount of seawater is allowed to pass through alkaline waste containing industrial calcium oxide to form a precipitate of magnesium hydroxide, followed by reacting with carbon dioxide and aerating to be stabilized with the atmosphere to prepare elution water concentrated in the form of bicarbonate ions having a concentration about several tens of times higher than natural seawater. Since the concentrated elution water has a higher density than natural seawater, it can be discharged into an area of the ocean of a relatively shallow depth for long-term sequestration of carbon dioxide, which is more economically efficient than the conventional ocean sequestration method. Therefore, it is possible to actively cope with carbon dioxide emission restrictions while achieving economical efficiency by securing a carbon emission right in the future.

MODE FOR CARRYING OUT THE INVENTION

Figure 1:
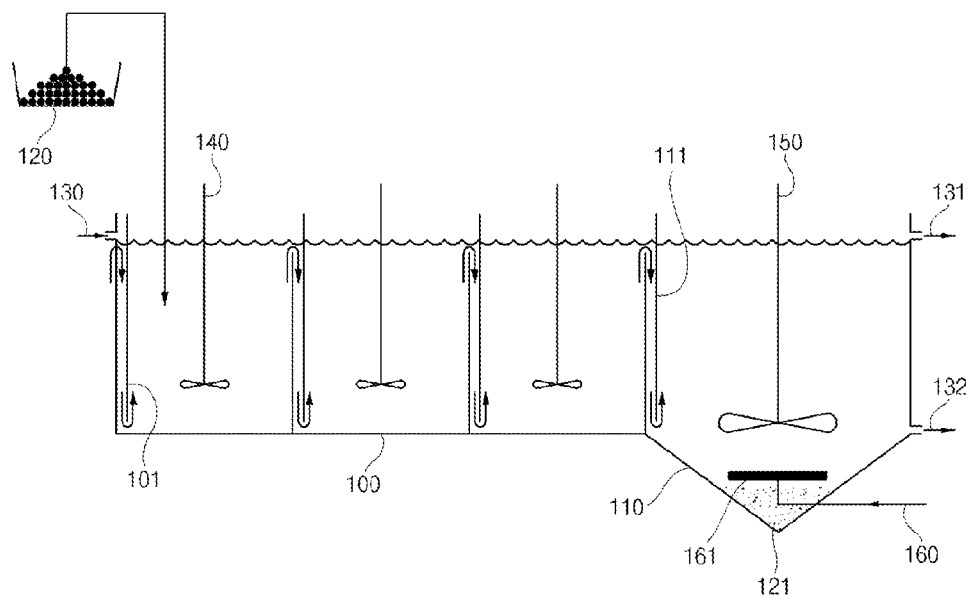
FIG. 1 is a schematic diagram illustrating a carbon dioxide concentration reactor using magnesium ion in seawater according to an embodiment of the present invention.

Hereinafter, exemplified embodiments of the present invention will be described in detail with reference to the accompanying drawings.

Various aspects of the present disclosure may be embodied in many different forms and should not be construed as being limited to the example embodiments set forth herein. Rather, these example embodiments of the disclosure are provided so that this disclosure will be thorough and complete and will convey various aspects of the disclosure to those skilled in the art.

In the drawings, the thickness of layers and regions are exaggerated for clarity. Here, like reference numerals refer to like elements throughout. As used herein, the term "and/or" includes any and all combinations of one or more of the associated listed items.

In addition, the terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprises" and/or "comprising," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Referring to FIG. 1, a carbon dioxide concentration reactor using magnesium ion in seawater according to an embodiment of the present invention is illustrated. In detail, FIG. 1 illustrates an exemplary carbon dioxide concentration reactor for concentrating carbon dioxide using precipitated magnesium ion resulting after allowing a predetermined amount of alkaline waste containing calcium oxide to pass through excess seawater.

As illustrated in FIG. 1, the carbon dioxide concentration reactor according to an embodiment of the present invention includes a multi-stage reactor system 100 and a precipitation tank 110.

Alkaline waste 120 containing calcium oxide and the seawater flowing into the multi-stage reactor system 100 through a seawater inflow line 130 are allowed to react with each other in the multi-stage reactor system 100 to generate and precipitate magnesium hydroxide.

In an exemplary embodiment, the multi-stage reactor system 100 is fully filled with the seawater fed with a constant flow. Then, calcium oxide present in the alkaline waste 120 and magnesium ion present in the seawater in a concentration of approximately 50 mM react with each other in the following manner to form and precipitate magnesium hydroxide. That is to say, precipitation of magnesium hydroxide may result from a difference in the solubility between calcium oxide and magnesium hydroxide. Here, the calcium oxide may be obtained from alkaline waste and other materials, but the present invention does not limit the source of the calcium oxide to that listed herein. The calcium oxide may also be directly supplied to the seawater.

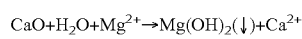

A physical agitator 140 may further be installed in each reactor of the multi-stage reactor system 100 to facilitate the reaction between the calcium oxide and the seawater. Accordingly, the reaction between the calcium oxide and the seawater vigorously takes place in each reactor of the multi-stage reactor system 100. Here, since the magnesium hydroxide produced in a solid phase includes very small sized particles, that is, nano-particles, it is not precipitated by the agitator 140 in each reactor of the multi-stage reactor system 100 but is passed to the next stage reactor of the multi-stage reactor system 100.

However, the other materials contained in the alkaline waste 120, other than the calcium oxide, are precipitated on the bottoms of the respective reactors while passing through the multi-stage reactor system 100, thereby functioning as a filter filtering some materials.

In FIG. 1, the multi-stage reactor system 100 including three reactors are illustrated, but the size or shape of each reactor and the number of reactors of the multi-stage reactor system 100 may be adjusted in consideration of the amount or precipitated state of the alkaline waste 120 injected. A total influx of the alkaline waste 120 of the seawater flowing in through the seawater inflow line 130 may be adjusted, and the flow rate of the alkaline waste 120 may also be adjusted according to the reaction state. The flowing-in seawater may flow along the multi-stage reactor system 100 and may finally overflow through a seawater outflow unit 131 while containing a larger amount of calcium ions than at the flowing-in time. That is to say, a supernatant in the seawater is exhausted.

In addition, partition walls 101 are vertically installed at front ends of the respective reactors of the multi-stage reactor system 100 and at a front end of the precipitation tank 110, which will later be described, so that the flow of the seawater is introduced to a bottom to then be discharged upwardly. Accordingly, the seawater stays in the multi-stage reactor system 100 and the precipitation tank 110 as long as possible, thereby yielding a maximum amount of magnesium hydroxide.

The precipitation tank 110 is installed at an end of the multi-stage reactor system 100. Therefore, when the seawater passes through the multi-stage reactor system 100, it is eventually introduced to the precipitation tank 110. In the precipitation tank 110, the generated magnesium hydroxide exists as precipitated magnesium hydroxide 121. Here, the precipitation tank agitator 150 is not driven to operate while generating the precipitated magnesium hydroxide 121. That is to say, an agitator 150 is also installed in the precipitation tank 110. The agitator 150 does not operate until the precipitated magnesium hydroxide 121 of greater than a predetermined amount is obtained.

In other words, if the calcium oxide contained in the injected alkaline waste 120 is sufficiently converted into magnesium hydroxide, the injecting of the seawater is stopped to allow the magnesium hydroxide to sufficiently precipitate in the precipitation tank 110.

Thereafter, high-concentration carbon dioxide or exhaust gas containing carbon dioxide is supplied to a diffuser 161 through a gas inflow line 160 and droplets of the exhaust gas are made smaller through the diffuser 161 to then be introduced to the precipitation tank 110. The gas inflow line 160 and the diffuser 161 are installed at bottom portions of the precipitation tank 110. That is to say, the diffuser 161 is positioned around a lower layer liquid in the seawater in the precipitation tank 110.

Here, the agitator 150 of the precipitation tank 110 is driven to operate to facilitate a reaction. That is to say, a reaction between the precipitated magnesium hydroxide 121 and carbon dioxide takes place in the precipitation tank 110 in the following manner, and excess bicarbonate ion exists in the seawater.

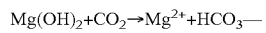

$$Mg(OH)_2 + CO_2 \rightarrow Mg^{2+} + HCO_3^-$$

Here, the excess carbon dioxide is dissolved, so that the pH level is lowered to 7.4 or less, which is lower than the pH adjusted level of magnesium hydroxide. However, after the reaction with the carbon dioxide is completed, the resultant product is subjected to aeration by a contact with the atmosphere through the gas inflow line 160 and the diffuser 161 to maintain equilibrium of bicarbonate ion and to restore the pH level to 8.0 or higher.

Meanwhile, a final seawater outflow unit 132 is installed at a lower portion of the precipitation tank 110, that is, between the seawater outflow unit 131 and the carbon dioxide/air inflow line 160, and concentrated seawater containing the bicarbonate ion is discharged to the ocean through the final seawater outflow unit 132. That is to say, the concentrated seawater containing the bicarbonate ion may be directly discharged to the ocean through a pipe line.

Figure 2:
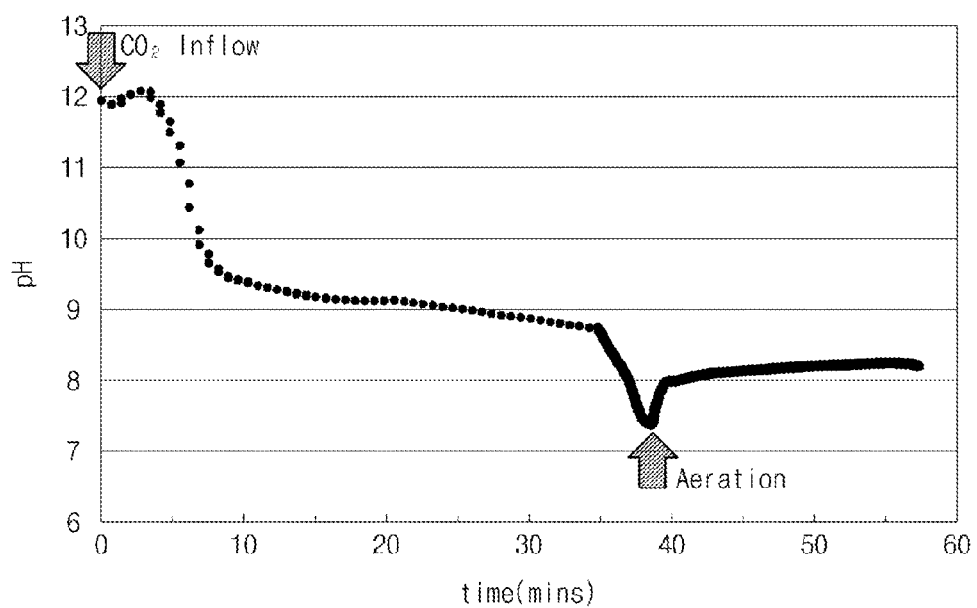
FIG. 2 is a graph illustrating pH changes after a reaction between calcium oxide and seawater, during a reaction between carbon dioxide and seawater and during aeration.

FIG. 2 is a graph illustrating pH changes after a reaction between calcium oxide contained in alkaline waste 120 and seawater, during a reaction between carbon dioxide and seawater and during aeration. In FIG. 2, the X-axis indicates the time and the Y-axis indicates the pH level.

A total content of inorganic carbon contained in the seawater is approximately 2 mM during a reaction between calcium oxide and seawater, and is then changed into approximately 200 mM during a reaction between carbon dioxide and seawater, and into approximately 120 mM after aeration. While the pH level is an importantly influential factor on the concentration ratio of carbonates, the pH level of the seawater resulting after the final reaction is in a range of between approximately 8.0 and approximately 8.2. Within the range stated above, $HCO_3^-$ ions occupy 95% or greater of the total carbonate content, suggesting that bicarbonate ion ($HCO_3^-$) stably exists in the seawater even when it is discharged to the ocean. Finally, aeration is performed to minimize $CO_2$ re-emission due to a contact between the atmosphere on the seawater surface and the seawater. Here, it was confirmed that the content of bicarbonate ion was about 60 times higher than that of natural seawater.

While the carbon dioxide concentration reactor using magnesium ion in seawater and the carbon dioxide isolation method using the same according to the present invention have been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

The invention claimed is:

1. A carbon dioxide concentration reactor using magnesium ions in seawater, wherein calcium oxide (CaO) or alkaline waste containing calcium oxide is injected into the seawater to allow the calcium oxide to react with magnesium ions present in the seawater to form magnesium hydroxide ($Mg(OH)_2$) for precipitation, after the precipitation of magnesium hydroxide, a supernatant of the seawater is removed and a lower layer liquid of the seawater containing the magnesium hydroxide and carbon dioxide are allowed to react with each other to convert carbon dioxide into concentrated seawater containing bicarbonate ions ($HCO_3^-$) having a higher concentration than in a natural state, wherein the concentration reactor comprises:
an alkaline waste supply unit supplying the calcium oxide or alkaline waste containing calcium oxide;
a seawater inflow unit for feeding the seawater;
a multi-stage reactor system supplied with the calcium oxide and seawater and allowing the calcium oxide and seawater to react with each other;
a precipitation tank installed at an end of the multi-stage reactor system and precipitating magnesium hydroxide generated from the calcium oxide and the seawater;
a seawater outflow unit installed at a top end of the precipitation tank and allowing the seawater remaining after reacting with the calcium oxide to be discharged;
a gas inflow unit installed at a bottom end of the precipitation tank, supplying the precipitation tank with carbon dioxide and air and allowing the carbon dioxide and magnesium hydroxide to react with each other to form bicarbonate ions; and
a concentrated seawater outflow unit installed in the precipitation tank and discharging concentrated seawater containing the bicarbonate ions.

2. The carbon dioxide concentration reactor of claim 1, wherein partition walls are installed at upstream ends of the respective reactors of the multi-stage reactor system and at an upstream end of the precipitation tank, so that the flow of the seawater is introduced to a bottom to then be discharged upwardly.

3. The carbon dioxide concentration reactor of claim 1, wherein an agitator is installed in each reactor of the multi-stage reactor system to facilitate a reaction between the calcium oxide and the seawater and to allow particles of the magnesium hydroxide to move up to the precipitation tank without being interrupted.

4. The carbon dioxide concentration reactor of claim 1, wherein the precipitation tank comprises:
a diffuser diffusing and flowing the carbon dioxide into the precipitation tank; and
an agitator facilitating a reaction between the carbon dioxide and precipitated magnesium hydroxide.

5. A carbon dioxide isolation method using magnesium ions in seawater, the carbon dioxide isolation method comprising:
injecting calcium oxide (CaO) or alkaline waste containing calcium oxide into the seawater to allow the calcium oxide to react with magnesium ions present in the seawater to form magnesium hydroxide ($Mg(OH)_2$) for precipitation;
after permitting precipitated magnesium hydroxide to settle sufficiently to form a lower layer liquid comprising the precipitated magnesium hydroxide and a supernatant of the seawater, removing the supernatant of the seawater and allowing the lower layer liquid of the seawater containing the magnesium hydroxide and carbon dioxide, which is added to the lower layer liquid, to react with each other to form concentrated seawater containing bicarbonate ions ($HCO_3^-$) having a higher concentration than in a natural state;

supplying the concentrated seawater with air to maintain equilibrium of bicarbonate ions in the seawater; and discharging the concentrated seawater to the ocean, wherein the pH of both the discharged seawater and the ocean seawater into which the discharged seawater is discharged has a pH of between 8.0 and 8.2.

6. The carbon dioxide isolation method of claim 5, wherein the discharging of the concentrated seawater to the ocean comprises directly discharging the concentrated seawater containing the bicarbonate ions to the ocean through a pipeline.

\* \* \* \* \*